United States Patent [19]
Hutson

[11] Patent Number: 5,379,268
[45] Date of Patent: * Jan. 3, 1995

[54] MULTI-DIMENSIONAL SIGNAL PROCESSING AND DISPLAY

[76] Inventor: William H. Hutson, 47 Grange Ave., P.O. Box 0221, Little Compton, R.I. 02837

[*] Notice: The portion of the term of this patent subsequent to Dec. 29, 2009 has been disclaimed.

[21] Appl. No.: 119,362

[22] Filed: Sep. 10, 1993

Related U.S. Application Data

[63] Continuation of Ser. No. 978,245, Nov. 18, 1992, Pat. No. 5,245,587, which is a continuation-in-part of Ser. No. 628,337, Dec. 14, 1990, Pat. No. 5,175,710.

[51] Int. Cl.⁶ ............................................. G01S 15/00
[52] U.S. Cl. ..................................... 367/100; 367/135; 367/901
[58] Field of Search ........................ 367/135, 100, 901; 365/517; 342/192, 203

[56] References Cited

U.S. PATENT DOCUMENTS

| | | | |
|---|---|---|---|
| 3,894,348 | 7/1975 | Fontaine | 340/728 |
| 4,736,199 | 4/1988 | Chadwick et al. | 434/9 |
| 4,995,011 | 2/1991 | Spiesberger | 367/127 |
| 5,175,710 | 12/1992 | Hudson | 367/135 |
| 5,245,587 | 9/1993 | Hudson | 367/135 |

Primary Examiner—Daniel T. Pihulic
Attorney, Agent, or Firm—Hale and Dorr

[57] ABSTRACT

A multi-dimensional acoustic, data processing and display system arranges acoustic data in a three-dimensional matrix. The three-dimensional matrix is compressed using singular value decomposition into singular vectors and singular values. A historical database is created and maintained and is also concatenated with the three-dimensional data. This database allows reverberation and noise to be diminished and other, weaker features in the data to be enhanced. Once the data is compressed, the data can be analyzed efficiently. The singular vectors are partitioned into one or more groups on the basis of their singular values or other criteria. Certain of the compressed data elements are enhanced or diminished by modifying the singular values within each of the groups of singular vectors. Selected singular vectors are processed further by other techniques for further enhancement, detection, isolation, feature extraction and classification. The compressed and enhanced data is then expanded back into three-dimensional form for display or for other processing.

40 Claims, 13 Drawing Sheets

FIG. 7

MULTI-DIMENSIONAL SIGNAL PROCESSING AND DISPLAY

BACKGROUND OF THE INVENTION

This is a continuation of application Ser. No. 07/978,245, filed Nov. 18, 1992, titled MULTI-DIMENSIONAL SIGNAL PROCESSING AND DISPLAY, now U.S. Pat. No. 5,245,587, continuation in part of application Ser. No. 07/628,337, filed Dec. 14, 1990 titled MULTI-DIMENSIONAL SIGNAL PROCESSING AND DISPLAY, that has issued as U.S. Pat. No. 5,175,710.

This application is a continuation-in-part of U.S. Ser. No. 07/628,337, filed December 14, 1990 now U.S. Pat. No. 5,175,710 and entitled "Multi-Dimensional Data Processing and Display", which is hereby incorporated by reference.

The invention relates in general to data processing systems for real-time, multi-dimensional analysis and display. More particularly, the invention is directed to a real-time processing system that processes multi-dimensional acoustic signals.

Active and passive acoustics are used in a variety of systems, including systems that detect or monitor underwater objects, medical ultrasound systems, and in medical cardio-phonogram systems. The following discussion will principally refer to underwater active sonar systems, but as will be easily seen, the concepts are directly applicable to other imaging systems.

In the sonar world, various techniques are currently used to process active and passive acoustic data to detect and monitor surface vessels, submarines and other submerged objects, such as mines. Although acoustic data is inherently three-dimensional, having correlative values for distance (range), horizontal angle (bearing) and vertical angle (depth), known systems analyze the data in two dimensions only, and therefore must sacrifice data analysis in one of these dimensions. Prior art systems typically perform data calculation on the data at a particular depression/elevation (D/E) angle in a bearing by range format. Furthermore, in current systems, each bearing direction is processed separately. Prior art systems therefore can analyze data from only one direction, or bearing, and D/E angle at a single time, and cannot correlate data across several bearings while maintaining the bearing data separately.

Current sonar monitoring systems usually receive reverberation, noise and other unwanted echoes that obscure valid contacts, such as a submerged submarine. These systems may use advanced, "matched filter" processing to enhance detection and classification of sonar contacts. By transmitting a complex waveform, such as a linear frequency modulated (LFM) signal, it is possible to enhance the detection and classification of sonar contacts over that which could be attained through transmission of a ping or single, short pulse. Although the complex waveform may be much longer than a pulse, it is possible through pulse compression techniques (i.e. through the use of advanced correlation, or matched filter processing) to achieve high resolution range detection at lower signal-to-noise ratios. However, because of spatial and temporal variations in received acoustic energy, further processing is required to normalize the data for subsequent detection and display.

A typical low-frequency and mid-frequency (1-10 KHz) sonar monitoring system may consist of between 10 and 400 channels of data, each channel sampled at a rate in excess of 12,000 samples per second. These data are typically preprocessed, including automatic gain control, signal conditioning and frequency band-shifting. The result of this preprocessing generally results in a data rate reduced from thousands of samples per second (KHz) to a data rate under 300 samples per second per channel. Even at this lower data rate, a typical active sonar system may have to filter, detect, analyze and display well over 100,000 samples per second.

Similar active and passive acoustic data processing techniques are routinely used in the medical field. For example, sounds in the heart are monitored and analyzed using passive sonar monitoring data, resulting in cardio-phonograms.

Medical ultrasound diagnostic techniques use active sonar data to provide images of features in the body. High frequency sound waves (500 KHz to 25 MHz) are used to obtain information about the structure and functioning of organs in the body by producing images of blood flow and soft-tissue structures which are not readily visible through other medical modalities, such as x-ray, PET, MRI, etc. Images are created by transmitting ultrasound into the body and detecting ultrasound echoes off of tissue boundaries. Ultrasound transmissions may be in the form of pulsed energy at a high pulse repetition frequencies (PRFs). High frequencies and high PRFs enable finer resolution of internal structures. However high frequencies are more heavily attenuated within the body, resulting in weaker echoes from deep structures. Such undesirable effects may be somewhat ameliorated by increasing the power of the transmitted energy, but at the cost of increased reverberation, sidelobe leakage and other deleterious artifacts. Thus, the design and implementation of ultrasonic imaging systems generally involves trade-offs between range resolution, angular resolution and other, opposing physical effects. Consequently, most ultrasound systems require considerable attention from an operator or diagnostician in order to fine tune the systems to maximize the display of useful diagnostic information.

Ultrasound imaging systems may transmit pulsed energy along a number of different directions, or ultrasonic beams, and thereby receive diagnostic information as a function of both lateral direction across the body and axial distance into the body. This information may be displayed as two-dimensional, "b-scan" images. Such a two-dimensional presentation gives a planar view, or "slice" through the body and shows the location and relative orientation of many features and characteristics within the body. B-scan images may be updated as the ultrasonic transmissions are repeated at frame rates between 15 and 60 times a second. Therefore, computational load, resolution and overall performance are critical features in ultrasound systems. Furthermore, by tilting or moving the ultrasonic sensor across the body, a third dimension may be scanned and displayed over time, thereby providing three-dimensional information.

Alternatively, ultrasound returns may be presented in the form of "m-scan" images, where the ultrasound echoes along a particular beam direction are presented sequentially over time, with the two axes being axial distance versus time, which are updated up to 1,000 times a second. Thus, m-scan displays enable diagnosis of rapidly moving structures, such as heart valves. For some m-scan procedures, the sensor may remain at a single (lateral) direction, whereas for other procedures, the sensor may be tilted to sweep through the length of a heart or other internal organ.

Some ultrasound systems may combine both b-scan and m-scan images within the same display. This presentation of data may be helpful in locating and directing the orientation of the ultrasound beam for the m-scan display.

Other ultrasound systems may include doppler elements which may be used to monitor the flow direction and velocity of blood or other fluids within parts of the body. In some systems, a continuous wave (CW) tone is used to measure the average doppler signature along a particular beam direction within the body. Other systems which use pulsed wave (PW) doppler, may be used to obtain velocity information as a function of depth within the body.

Some ultrasound systems may operate in a duplex doppler mode, which combines both b-scan and doppler information in the same display. These systems present flow direction and speed along multiple directions and depths, presented as various colors superimposed upon b-scan images.

Other ultrasound imaging systems may simultaneously present multiple ultrasound information, including b-scan, m-scan and doppler image displays, along with other information, such as EKG signals and/or phonograms.

The present invention is designed to improve the ability to reduce interference in medical images caused by specular noise, gas, shadowing, reflections and "ghosting," in real-time. In a similar manner, the present invention is designed to improve the ability to reduce interference in sonar, including reverberation, clutter, multipath returns and specular noise.

The present invention is not limited to processing acoustic signals in ocean surveillance, medical imaging or medical monitoring systems. Digital data and images can be formed from a variety of other input data signals, including seismics, radar, lidar (laser), other electronic emissions, x-rays, including CAT scans, magnetic/RF emissions, including MRI and MRA, and visible light. Because such digital images require large amounts of computation and data storage, it is difficult to perform complex processing of the digital information on a real-time basis.

It is therefore an object of the present invention to provide a multi-dimensional acoustic data processing system that operates in "real-time."

It is a further object of the invention to provide a multi-dimensional acoustic data processing system that allows the suppression of certain features, interference, and noise, and the enhancement of other characteristics in order to "focus-in" on features or characteristics of interest.

It is also an object of this invention to enable the "data fusion," or intercorrelation, of multiple sets of data which describe different aspects of some physical entity or process.

Yet another object of the invention is to provide a multi-dimensional acoustic data processing system that compresses data for further processing and for transmission to a remote location and reconstitution of the received data to accurately represent the original image.

It is also an object of the invention to enhance and store acoustic data in a compressed form, for example as a movie replay of features moving within a three-dimensional, transparent data cube.

SUMMARY OF THE INVENTION

In the preferred embodiment, the multi-dimensional acoustic data processing and display system of the present invention is used with an acoustic data monitoring system. The monitoring system provides complex acoustic data in complex form, often the amplitude and phase (or in-phase and quadrature, I and Q, components) of the received signal, at sequential time intervals, to the processing system. The data is received from multiple directions, and is arranged in a three-dimensional matrix, the dimensions being bearing, range and D/E angle. Thus, each data element in the matrix represents the amplitude and phase of the signal received at the specified bearing, D/E angle and range.

The input data is scaled to accentuate or suppress certain bearings, D/E angles or ranges. The three-dimensional matrix is separated into a number of matrices of two-dimensional data which are concatenated together along the range dimension to form one large two-dimensional matrix.

The invention creates and maintains a historical database which is also concatenated with the two-dimensional matrix. This database allows reverberation and noise to be diminished and other, weaker features or characteristics in the data to be enhanced.

Once the data is in the form of a two-dimensional matrix, the data can be analyzed efficiently using Singular Value Decomposition. The concatenated two-dimensional matrix is decomposed to obtain a compressed form of the matrix. In the preferred embodiment, singular vectors and singular values are obtained. The singular vectors are partitioned into one or more groups, or subspaces, on the basis of their singular values or other criteria.

Certain data elements in the two-dimensional matrix are enhanced or diminished by modifying the singular values within each of the groups of singular vectors. Selected singular vectors which represent a compressed form of features or characteristics of interest may be processed further by other techniques for further enhancement, detection, isolation, feature extraction and classification.

An enhanced, two-dimensional concatenated matrix is generated by multiplying the two-dimensional concatenated matrix by a diagonal matrix of the modified singular values and a matrix of enhanced singular vectors. The enhanced two-dimensional matrix has enhanced or diminished values associated with certain data features of interest.

After data enhancement, the enhanced, concatenated two-dimensional enhanced matrix is partitioned into a series of two-dimensional matrices which are then rearranged to form an enhanced three-dimensional matrix. All or portions of the enhanced three-dimensional matrix can then be displayed. The preferred embodiment displays data features or characteristics as opaque objects within an otherwise transparent data cube.

BRIEF OVERVIEW OF THE DRAWINGS

Other objects, features, and advantages of the invention will become apparent from the description of a particular embodiment, taken in combination with the drawings, in which:

FIG. 7 is the acoustic data of FIG. 6 in matrix form;

DETAILED DESCRIPTION OF A PREFERRED EMBODIMENT

The multi-dimensional image processing system of the present invention operates in "real-time." It processes input acoustic data signals and produces an image having three or more dimensions that shows features (or characteristics) within the acoustic data. It also allows the suppression of certain characteristics and the enhancement of other characteristics in the acoustic data. The acoustic data is compressed for further processing and enhancement. The compressed data or compressed and enhanced data can be transmitted to remote locations and then reconstituted when received at the remote location to accurately represent features within the original data.

The invention may be used with acoustic data derived from a variety of sources. In one embodiment, active acoustic data is derived from an ocean-going sonar monitoring system. In a second embodiment, passive acoustic data is derived from an ocean-going sonar monitoring system. In a third embodiment, active acoustic data is derived from a medical ultrasound monitoring system. In a fourth embodiment, passive sonar data is derived from a cardio-phonogram monitoring system. It will be seen that the invention can easily be used with sonar data derived from other systems and with other types of data.

Figure 1:
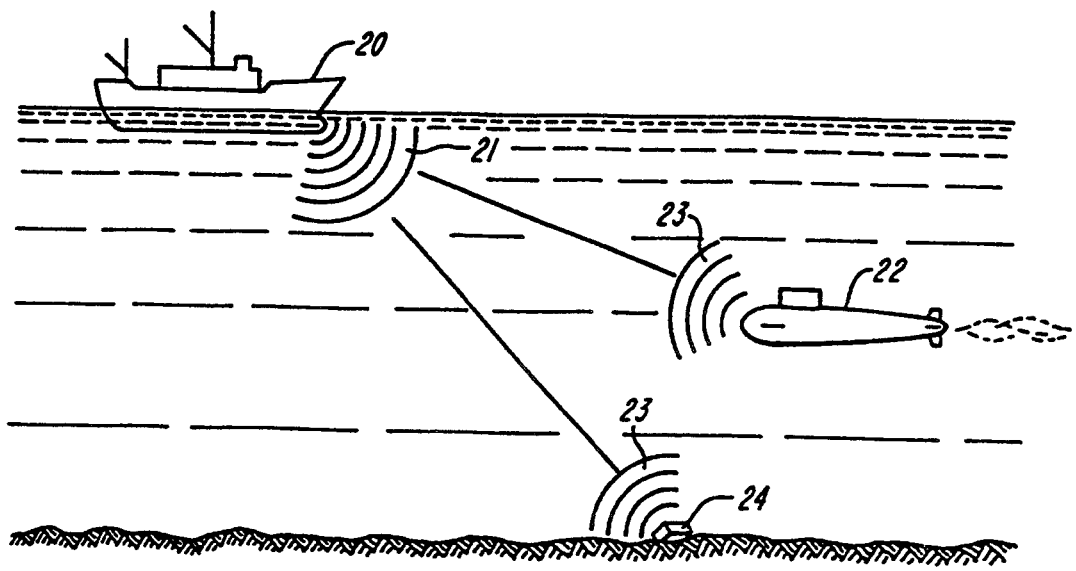
FIG. 1 is an ocean-going sonar monitoring system.

FIG. 1 shows one embodiment of the present invention in which active acoustic data is derived from an ocean-going sonar monitoring system. A ship 20 transmits signals 21 through a beamformer or other device. Echoes 23 off submarine 22 and mine 24 are received by ship 20.

Figure 2:
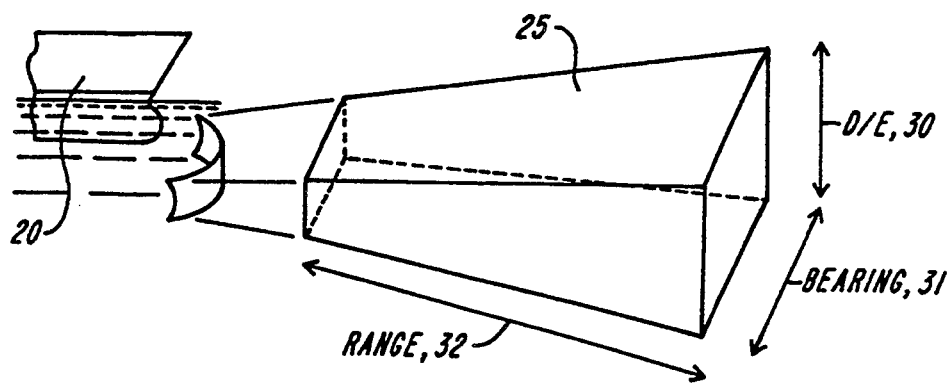
FIG. 2 is the acoustic data received through the monitoring system of FIG. 1.

FIG. 2 shows the acoustic data 25 received through the beamformer of FIG. 1. The data represent the real and imaginary components (or alternatively, the amplitude and/or phase) of the echoes 23 within a specified frequency band. The acoustic data 25 is arranged in three dimensions, vertical angle 30 (also referred to as D/E, or depression/elevation angle), horizontal angle 31 (also referred to as bearing) and range 32 (also referred to as distance from the monitoring system).

Figure 3:
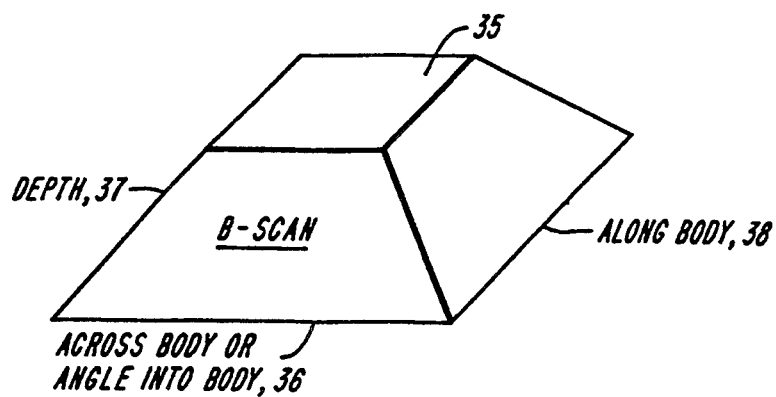
FIG. 3 is active acoustic data as derived from a medical ultrasound monitoring system as a sensor of the ultrasound monitoring system moves laterally along the body.
Figure 4:
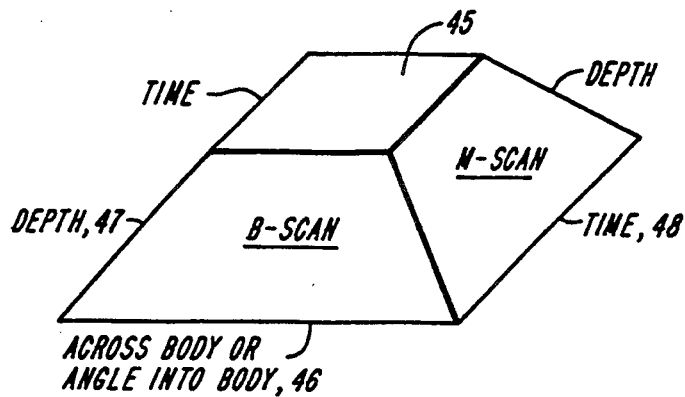
FIG. 4 is active acoustic data as derived from a medical ultrasound monitoring system as a sensor of the ultrasound monitoring system is held in one position on the body.

FIGS. 3 and 4 show active acoustic data as derived from a medical ultrasound monitoring system in an alternative embodiment of the present invention. In medical ultrasound systems, high frequency sound waves (500 KHz to 25 MHz) are transmitted into the body. Echoes off organs or other soft tissue are received and processed by the present invention. The acoustic data received from the ultrasound monitoring system represents the amplitude (or amplitude and phase) of the echo, within a specified frequency band, for a selected section of the body.

In FIG. 3, the acoustic data 35 is received as a sensor of the ultrasound monitoring system moves laterally along the body. The acoustic data is three-dimensional, having dimensions lateral angle-across-body 36 (also referred to as bearing), depth-into-body 37 (also referred to as range or distance), and sensor location 38 along the body (also referred to as D/E angle).

FIG. 4 shows acoustic data 45 that is received as the sensor of the ultrasound monitoring system is held in one position on the body. The dimensions of this three-dimensional data cube are angle-across-body 46 (also referred to as bearing) by depth-into-body 47 (also referred to as distance) by time 48 (analogous to D/E angle in the following discussion).

Figure 5:
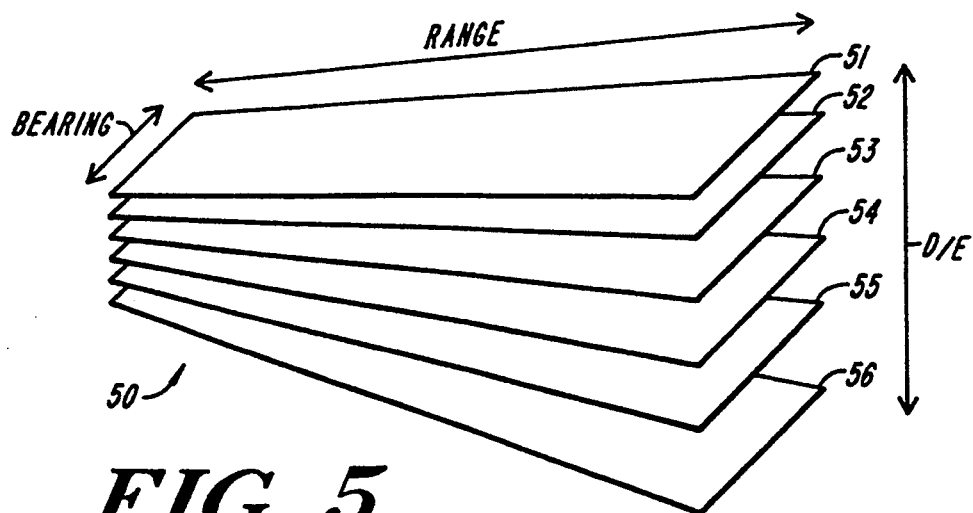
FIG. 5 is three-dimensional acoustic input data as derived from a monitoring system.

FIG. 5 shows three-dimensional acoustic input data 50 as derived from a monitoring system. The monitoring system could be the underwater monitoring system shown in FIGS. 1 and 2, the ultrasound medical imaging system represented shown in FIGS. 3 and 4, or from some other monitoring system. Multiple two-dimensional bearing vs. range data matrices 51, 52, 53, 54, 55 and 56, one for each depression/elevation angle, are stacked on top of one another, creating a three-dimensional data "cube" 50 having dimensions bearing by range by depression/elevation angle. The amplitude and phase of a signal can be determined by reading the complex data value stored in the cube at any given bearing, D/E and range.

Figure 6:
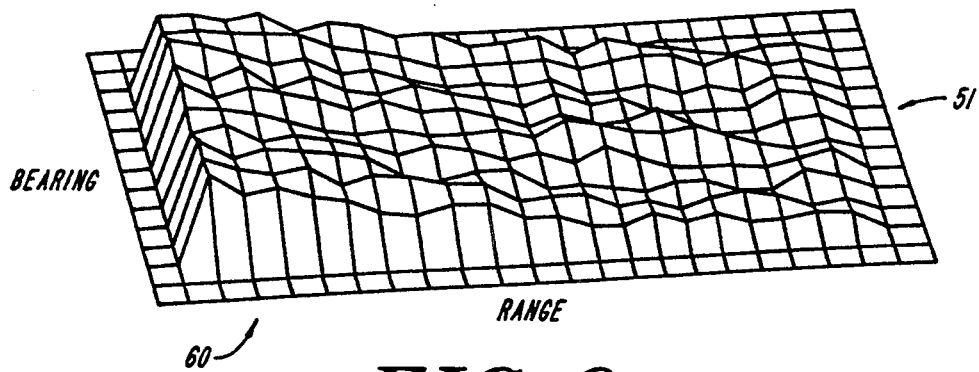
FIG. 6 is a contour graph of acoustic input data for one depression/elevation angle.

FIG. 6 shows a contour graph of acoustic input data 60 for one depression/elevation angle (such as D/E layer 55 of FIG. 5). The range of the input data is shown along the horizontal axis, bearing is shown along the vertical axis, and the amplitude of the input data is shown by the height of the data line.

Figure 7:
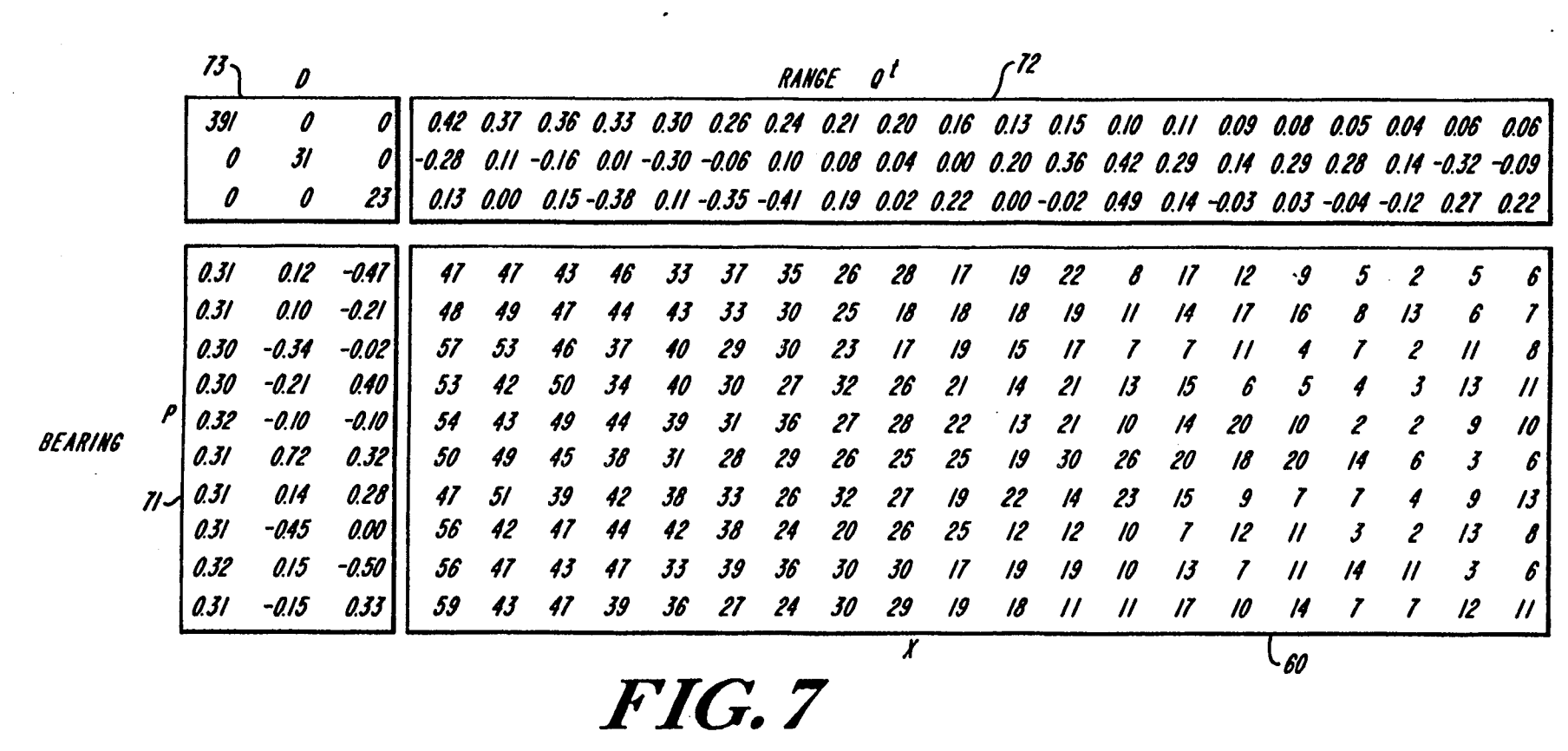

FIG. 7 shows the acoustic data 60 of FIG. 6 represented in a matrix X containing elements arranged in a two-dimensional format. Each row is associated with a bearing being monitored, while each column is associated with a range being monitored.

Matrix analysis using singular values and singular vectors is well known in the prior art and can be used to analyze the acoustic data when it is represented in matrix format, as shown in FIG. 7. The following publications describe such matrix analysis in detail: *Digital Spectral Analysis with Applications*, S. L. Marple, 1987; *Matrix computations*, G. H. Golub and C. F. Van Loan, 1989; "Singular Value Decomposition and Least Squares Solutions", *Numerical Math*, G. H. Golub and C. Reinsch, 1970; *LINPAC User's Guide*, J. J. Dongarra, et. al., 1979; and "An Improved Algorithm for Computing Singular Value Decomposition", T. F. Chan, *Communications of the ACM*, 1982. Matrix analysis through the use of eigenvectors and eigenvalues are also well known in the prior art.

The matrix X, representing the active sonar data 60 for one D/E angle as shown in FIG. 7, can be decomposed, as described in the above references, into left singular vectors 71, right singular vectors 72, and singular values 73. The left singular vectors are arranged in the columns of the matrix P 71 and describe features in terms of their distribution in bearing. The right singular vectors are arranged in the rows of a matrix $Q^t$ 72 and describe features in terms of their range characteristics. The singular values are arranged along the principal diagonal in a matrix D 73 and describe the magnitude of the features. Information in the matrix X 60, which contains input data, can be represented by its singular vectors P 71 and $Q^t$ 72 and its singular values D 73. The raw data can thus be represented in a substantially compressed form. For example, in the above example, the data matrix X contains 10 rows of 20 data points each, for a total of 200 data elements. Through singular value decomposition, these data may be closely approximated by three sets of singular values and vectors, P, D, and $Q^t$, for a data compression of over 50%. In a full active sonar application involving hundreds of beams, the compression may exceed 95%, and the resulting computational savings may exceed 90%.

Figure 8:
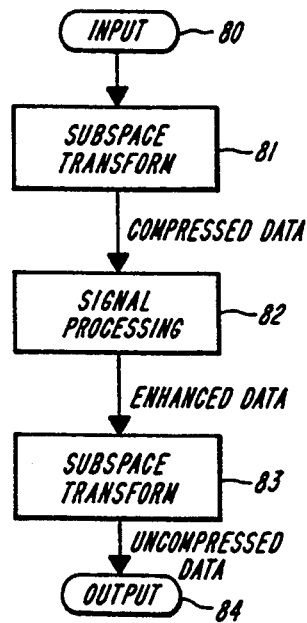
FIG. 8 is a flow chart of the acoustic data processing system of the present invention.

Referring to FIG. 8, according to the present invention, the input acoustic data 80 is first transformed into a compressed and enhanced form by the Subspace Transform Function 81. The compressed and enhanced data, rather than the original data, is then passed on for further signal processing 82, such as frequency analysis, matched filter processing, doppler processing and classification. By modifying or eliminating the principal singular vector, spatial and temporal normalization is not required. By modifying or eliminating other singular vectors associated with noise-like components in the data, subsequent detection and classification performance are improved and the final display of the results are enhanced. Furthermore, by working with the compressed and enhanced data rather than the original data, the overall processing load of subsequent processing techniques is reduced. In a typical active sonar application involving 10 beams, the compression obtained may exceed 80%, and the resulting computational savings may exceed 50% of conventional processing used in prior art systems. In a full active sonar application involving 400 beams, the compression obtained may exceed 97%, and the resulting computational savings may exceed 90% of conventional processing. The enhanced data is then expanded by Subspace Transform Function 83. Output data 84 may be displayed or processed by other systems.

The singular vectors and/or singular values are used by the real-time multi-dimensional processing system of the present invention as a filter to enhance and/or suppress features within the sonar data. The singular values D are displayed in a diagonal form and represent the weights used to adjust the singular vectors. The left singular vectors P represent the bearings of features of interest, while the right singular vectors $Q^t$ correspond to the range characteristics of the features.

The right singular vectors $Q^t$ and singular values D are used to represent important features within the input data, but in a substantially compressed form. This allows the data to be enhanced, further processed, and displayed, without losing any necessary data, but saving substantial amounts of computations. For example, matched filter processing of a small subset of singular vectors could be processed instead of the full set of hundreds of beams. In addition, because the present invention substantially reduces the amount of computations, more data and/or more sophisticated analyses can be processed in real time.

In the preferred embodiment of the present invention, the data processing system uses singular value decomposition to describe patterns, remove unwanted components, and isolate and analyze components of interest in the sonar data. In alternate embodiments, eigenvector decomposition of the cross-product matrix of the sonar data may be used to decompose the sonar data. Eigenvector decomposition is also well known in the prior art.

Figure 9:
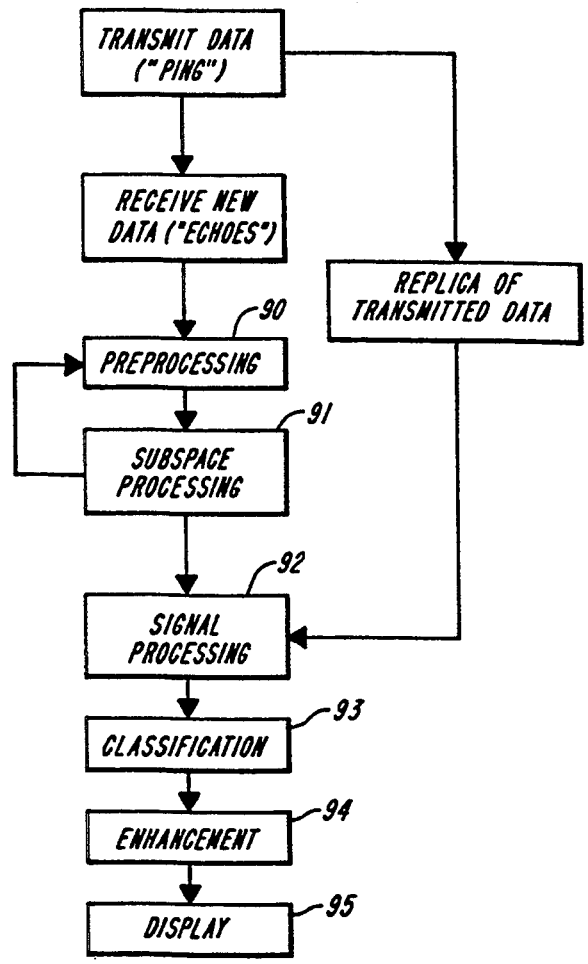
FIG. 9 is a flow chart for the main algorithm of the preferred embodiment of the present invention.

Referring to FIG. 9, a flow chart for the main algorithm of the preferred embodiment of the present invention is shown. Initially, three-dimensional acoustic input data (as shown in FIG. 5) is obtained, weighted and reformatted into one or more two-dimensional matrices by a Preprocessing Function 90. The two-dimensional data matrix is decomposed into its singular values and singular vectors by Subspace Processing Function 91. The resulting compressed and enhanced left and right singular vectors P, Q are passed forward to Signal Processing Function 92 for further enhancement and detection. Both left and right singular vectors P, Q are then sent to Classification Function 93. The data is expanded into an enhanced, three-dimensional form by Enhancement Function 94 and then displayed at 95.

As the sonar input data is passed in a forward direction through these functions, information is also passed backwards to assist in enhancement and monitoring features of interest. In the preferred embodiment, history data is a special set of bearing and range traces that represent the position and range-dependent characteristics of acoustic features within the surrounding area.

The range traces are in the form of right singular vectors which are associated with features of interest $Q_{fi}$ and with characteristics of selected features not of interest $Q_{fn}$. In addition, some of the features of interest $Q_{fi}$ have been weighted, (e.g., by the square roots of their corresponding singular values), to form weighted features of interest $Q_{wfi}$. The bearing traces represent the bearing characteristics of features of interest $P_{fi}$, weighted features of interest $P_{wfi}$, and features not of interest $P_{fn}$. The bearing history data are in the form of left singular vectors.

History data of features of interest $Q_{fi}$, $P_{fi}$ are calculated by the Subspace Processing Function and are passed back to the Preprocessing Function to be concatenated with new data. The purpose of this feedback is to build the energy from weak features of interest to the point where the features of interest may be distinguished from background noise.

Weighted history data for features of interest $Q_{wfi}$, $P_{wfi}$ is also passed forward to the signal processing function to allow features of interest to be enhanced, and other, unwanted features, to be diminished.

The history data of features not of interest, $Q_{fn}$, $P_{fn}$ is also calculated by the Subspace Processing Function and is fed back to the Preprocessing Function and forward to the Signal Processing Function. This information is used to set parameters for further analysis or enhancement, or removal, and in alternate embodiments may be used to show reverberation in the data without obscuring features of interest or to reconstruct the original data.

The Preprocessing Function

Figure 10:
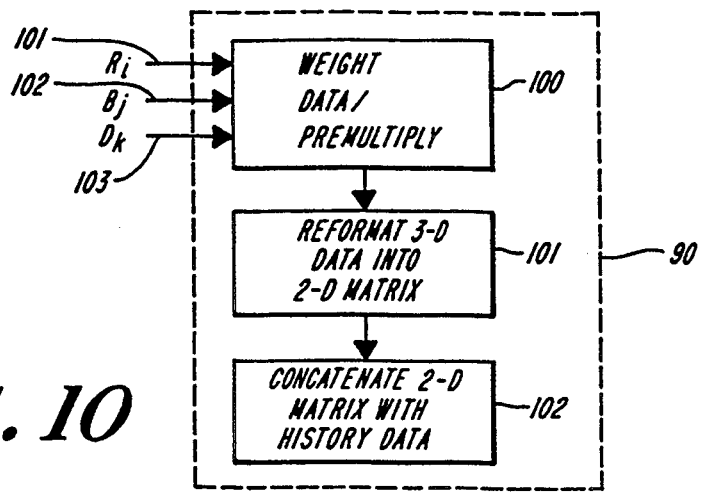
FIG. 10 is a flow chart of the Preprocessing Function.

FIG. 10 shows the Preprocessing Function 90 in greater detail. The preprocessing function weights the input data to accentuate or suppress certain bearings, ranges, and/or depression/elevation angles at 100. Each range has a range coefficient $R_i$ 101 which is used to appropriately scale the data at each range. Each bearing also has an associated bearing coefficient $B_j$ 102, which is used to appropriately scale the data at specified bearings. Similarly, each depression/elevation angle has an associated D/E angle coefficient $D_k$ 103, which is used to scale the data at that depression/elevation angle.

Increasing the magnitude of data at selected bearings, ranges, and depression/elevation angles increases the importance of the associated data in subsequent analyses. Decreasing the magnitude of data at other selected bearings, ranges, and depression/elevation angles similarly decreases the importance of the associated data in subsequent analyses. The bearing, range and depression/elevation angle coefficients can either be preset, set by an automatic function, or interactively altered by an operator.

In the preferred embodiment of the present invention, the singular vectors $P_{fn}$ and $Q_{fn}$ may be used to remove selected features not of interest from the data. For example, new data $X_{t+1}$ may be premultiplied by $P^t{}_{fn}$ to obtain an update of $Q^t{}_{fn}$, then expanded by premultiplying by $P_{fn}$ and subtracted from $X_{t+1}$, i.e.

$$X_{(t+1)}r = X_{(t+1)} - P_{fn}(P^t{}_{fn} X_{t+1}),$$

or alternatively, through mathematical identities, $$X_{(t+1)}r = (I - P_{fn} P^t{}_{fn}) X_{t+1}$$

However, in other embodiments, it may be computationally more efficient to enhance the input data by postmultiplying the input data by previously determined right singular vectors $Q^t{}_{fn}$. In this manner, features not of interest may be removed from the input data in the Preprocessing Function.

Subspace Processing Function

Figure 11:
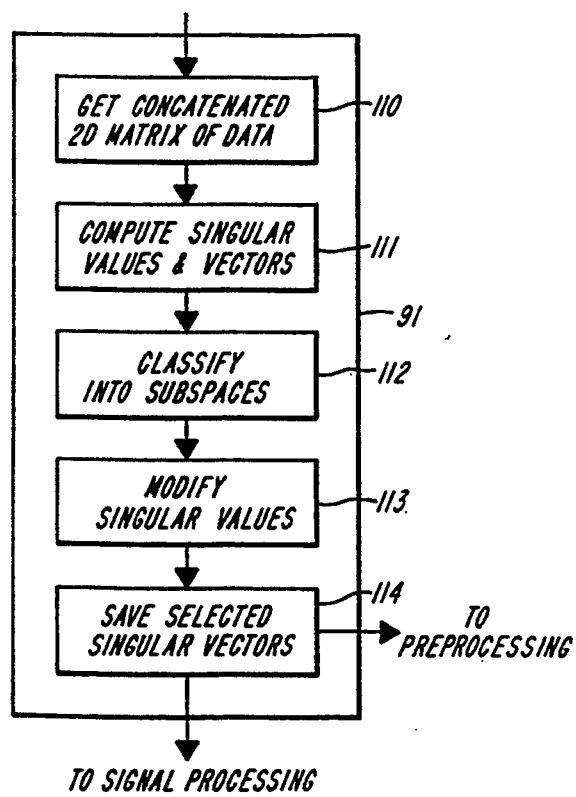
FIG. 11 is a flow chart of the Subspace Processing Function.

Referring to FIG. 11, the Subspace Processing Function 91 is shown in greater detail. The Subspace Processing Function compresses the two-dimensional data, analyzes the data in terms of its dominant singular values and associated left and right singular vectors, and partitions the data into subspaces on the basis of their singular values, structure of their singular vectors, or other criteria. The singular values are modified to enhance certain data and selected singular vectors are passed on for further signal processing, tracking and classification. Selected singular vectors may be passed back to the Preprocessing Function to enhance data in subsequent analyses.

Figure 12:
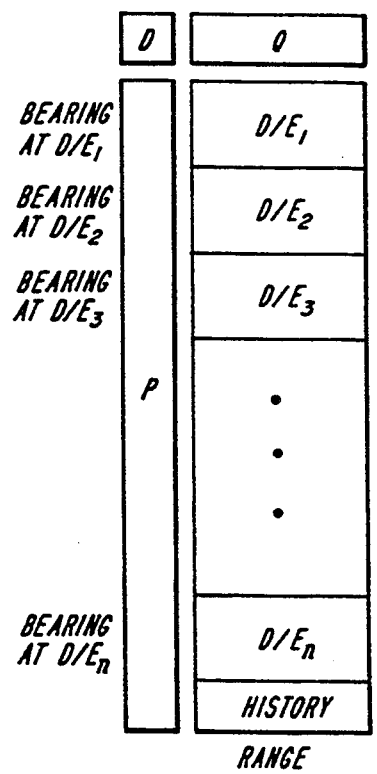
FIG. 12 is the acoustic data as decomposed by the preferred method into a compressed form.

The two-dimensional data obtained from the Preprocessing Function 90 is compressed by the Subspace Processing Function 91. There are several ways that the three-dimensional data may be compressed. Referring to FIG. 12, the preferred method to decompose the three-dimensional data into a compressed form is shown. The three-dimensional data (as shown in FIG. 5) is separated into a number of two-dimensional matrices by the Preprocessing Function 90. Each matrix has dimensions bearing vs. range for one D/E angle. The multiple two-dimensional matrices are then concatenated along a common dimension (shown at 101). In the preferred embodiment, the two-dimensional matrices are concatenated along the range dimension, resulting in one concatenated two-dimensional matrix. The matrix has range in one dimension and a combination of depression/elevation angle and bearing in the other dimension. Range history data from previous analyses are concatenated along the bottom of the matrix (shown at 102). The concatenated two-dimensional matrix is obtained by the Subspace Processing Function at 110 and decomposed into its singular values D, right singular vectors Q and left singular vectors P at 111.

Figure 13:
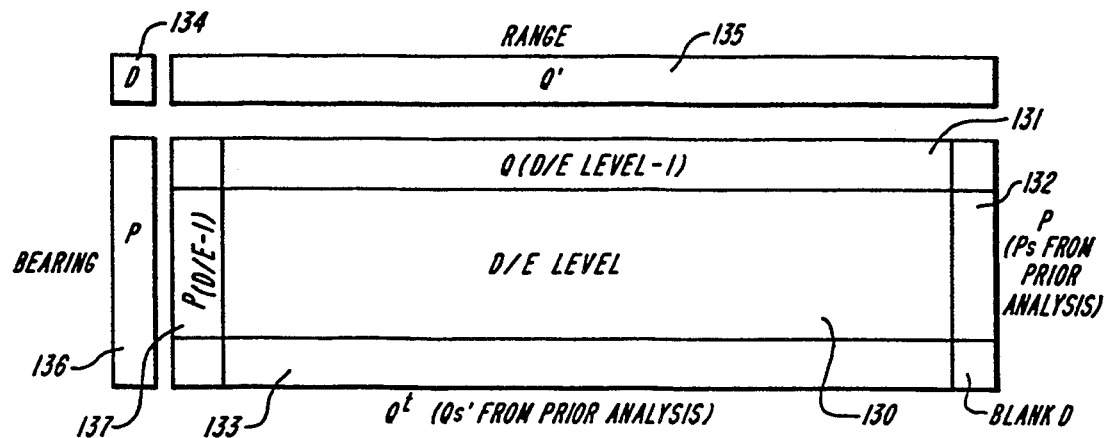
FIG. 13 is the acoustic data as decomposed by a first alternate method into a compressed form.

Referring to FIG. 13, a first alternate method to decompose the three-dimensional acoustic data into a compressed form is shown. In this method, data at each D/E level is decomposed into singular vectors and singular values, subsets of which are then concatenated with the next D/E level. For each D/E level, data is formatted into a two-dimensional data matrix 130 having dimensions bearing vs. range. As each D/E level is processed, right singular vectors $Q_{(D/E\ level-1)}$ 131 from previous analyses are appended to the top of the fused matrix. Left singular vectors $P_{(D/E\ level-1)}$ 137 from previous analyses are appended to the left of the fused matrix. Right singular vectors $Q_{(D/E\ level-1)}$ 131 and left singular vectors $P_{(D/E\ level-1)}$ 37 represent the three-dimensional data that has already been processed. History data in the form of left singular vectors P 132 (from prior analyses) are appended to the matrix on the far right column. History data in the form of right singular vectors $Q^t$ 133, (from prior analyses) are appended to the matrix on the lower row. This matrix is decomposed into its singular values D 134, right singular vectors Q' 135 (representing range) and left singular vectors P 136 (representing bearing). The left and right singular vectors 135, 136 are then concatenated with the next D/E level.

Figure 14:
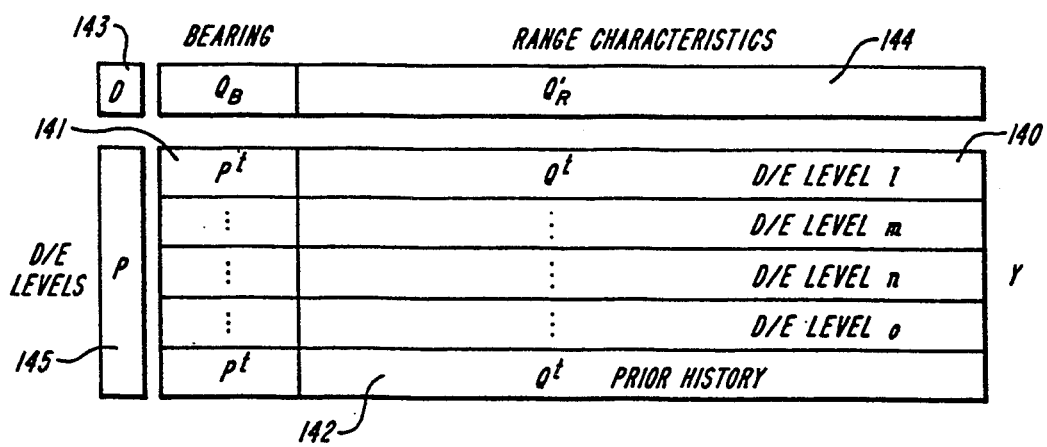
FIG. 14 is the acoustic data as decomposed by a second alternate method into a compressed form.
Figure 15:
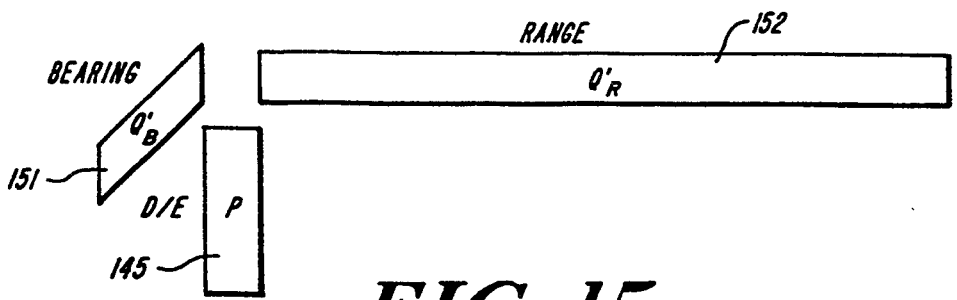
FIG. 15 is a further compression of the compressed data of FIGS. 12, 13, or 14.

Referring to FIG. 14, a second alternative method to decompose the three-dimensional data into a compressed form is shown. Each D/E layer is separately decomposed into left singular vectors P and right singular vectors $Q^t$. These vectors are then concatenated, or "fused", together to form one matrix Y 140. History data in the form of left singular vectors $P^t$ 141 and right singular vectors $Q^t$ 142 are also concatenated to the matrix. Each row is pre-multiplied by a scale factor, such as the square root of the associated singular value. The fused matrix is then decomposed into its singular values D 143, right singular vectors Q' 144 and left singular vectors P 145. Referring to FIG. 15, the left and right singular vectors P and Q' obtained from the second alternate compression method represent important characteristics of the entire sonar data cube for a single ping in compressed form. The D/E characteristics are contained in the left singular vector P 145. The bearing characteristics are described by the leftmost portion 151 of the right singular vector $Q_B^t$ 144. The range characteristics of the ping data are described by the rightmost portion 152 of the right singular vector $Q_R^t$ 144.

History Data

In the preferred embodiment, history data is a special set of bearing and range traces that represents the position and status of acoustic features within the surrounding area. The range traces are in the form of right singular vectors which are associated with features of interest $Q_{fi}$. The bearing traces are in the form of left singular vectors which are associated with features of interest $P_{fi}$. In addition, some of the features of interest $Q_{fi}$, $P_{fi}$ have been weighted, to form weighted features of interest $Q_{wfi}$, $P_{wfi}$. In alternate embodiments, depression/elevation angle may also be incorporated in a history database.

The history data for features of interest $Q_{fi}$, $P_{fi}$ are continuously updated by the Subspace Processing Function and are passed back to the Preprocessing Function. The histories of features of interest $Q_{fi}$, $P_{fi}$ are in the form of singular vectors, which are determined through analysis of the singular values or other criteria in the Subspace Processing Function. The history data of the features of interest, $Q_{fi}$, $P_{fi}$ are scaled and concatenated with the weighted sonar data in the two-dimensional data matrix.

Figure 16:
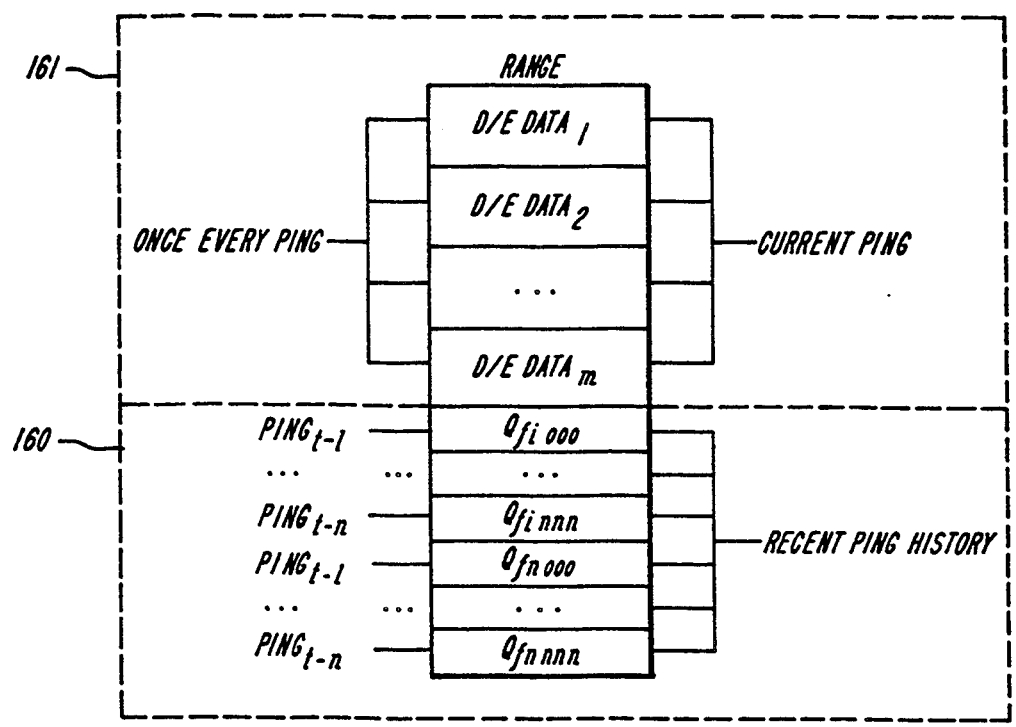
FIG. 16 is the range history database for features of interest according to the preferred embodiment.

Referring to FIG. 16, the range history database for features of interest (recent ping history 160) of the preferred embodiment is shown. The range history database retains range histories of features of interest $Q_{fi}$, from various depression/elevation angles. The input sonar data is combined with history data every ping. The entire data set, containing the current input sonar data 161 and historical data 160, is then analyzed using singular value decomposition. In the preferred embodiment, this process is repeated for every new data ping, although in alternate embodiments, the history database may be combined with current data at other time intervals.

The range history data base is created and continually updated using range history received from the Subspace Processing Function. The history data base contains historical data that shows the status of the surroundings as determined for several previous pings.

The range history database is updated by storing the most recently received history data of features of interest $Q_{fi000}$ and of features not of interest $Q_{fn000}$ every ping. Every ping, the history data $Q_{fi000}$ is "passed back," or stored in the database to represent the recent historical status. This data becomes $Q_{fi001}$.

In alternate embodiments, range, bearing and/or D/E history data for features of interest, features not of interest and/or noise may be similarly entered into a historical database.

The range history data for features not of interest $Q_{fn}$ is continuously updated by the Subspace Processing Function, and is passed back to be used by the Preprocessing Function. This data is also weighted and concatenated with the two-dimensional weighted sonar input data.

Figure 16A:
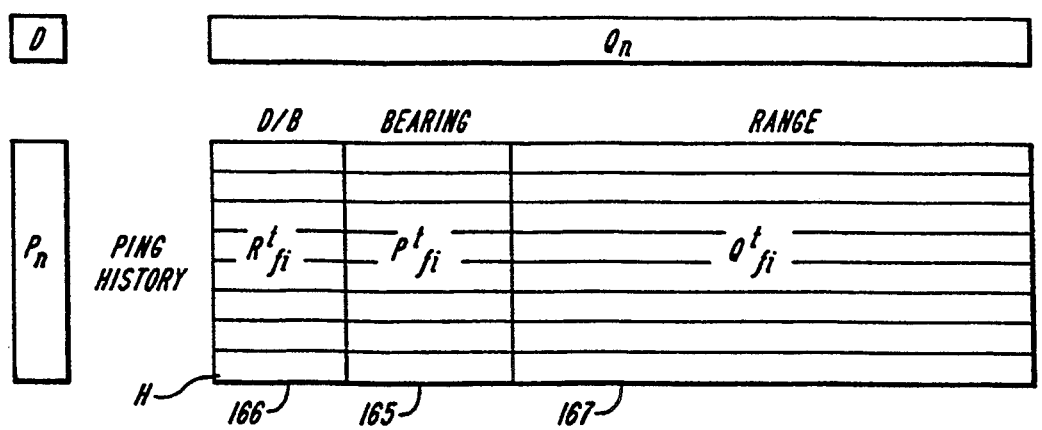
FIG. 16A is a history database in an alternate embodiment.

Referring to FIG. 16A, in an alternate embodiment, data for each ping is described in terms of three sets of singular vectors $P_{fi}$ 165, $Q_{fi}$ 167, and $R_{fi}$ 166. These data may be retained as an enhanced, compressed history of sonar data received for each ping over an extended sequence of pings. The history data may be further decomposed by singular value decomposition to maintain it in an even greater compressed form.

The present invention thus creates and maintains historical databases, which are efficiently maintained in compressed form, and represent the data at various time intervals. Each new analysis includes the compressed, historical data, which is equivalent to a full analysis of the full (uncompressed) historical data, yet at a fraction of the computational cost.

Left singular vectors are used for tracking objects as they move relative to the monitoring system and thus change bearing positions. The right singular vectors are used to identify the range of objects in the area being monitored and to classify features.

Referring again to FIG. 7, the matrix X 60 is defined in terms of its singular values D 73, its right singular vectors $Q^t$ 72, and its left singular vectors P 71. The singular value shown in the first row and the first column of the singular value matrix D, and having a value of 391, indicates the magnitude of the corresponding left and right singular vectors shown in the first column of matrix P and in the first row of the matrix $Q^t$. The right singular vector in the first row of $Q^t$ is shown decreasing in magnitude with range, indicating a general attenuation of acoustic returns with increasing range. Similarly, the singular value in the second row and second column of D, having a value of 31, indicates the magnitude of another, weaker feature. The right singular vector in the second row of the matrix $Q^t$, has its largest value, 0.42, towards the right end of the vector, indicating the magnitude and range characteristics of the feature of interest. The left singular vector in the second column of the matrix P, has its largest value of 0.72 at the 6th beam or bearing location, indicating in which direction a feature is located.

Referring again to FIG. 11, after obtaining a combination of concatenated data and compressed history in the form of a two-dimensional matrix, the Subspace Processing Function 91 at block 111 performs a singular value decomposition of the data. The Subspace Processing Function then at block 112 determines the subspace separation of the decomposed data. The history data corresponding to features of interest $Q_{fi}$ is computed by subspace selection. The singular vectors that have been derived from the input sonar data are classified into subspaces based on the magnitudes of the singular values or by some other criteria, such as by isolating certain ranges, bearings or depression/elevations. In the preferred embodiment, singular vectors are classified as one of three subspace categories: loud reverberation and interference, weak features of interest, and noise. There may be different subspace categories in alternate embodiments.

In the preferred embodiment, the subspaces are selected in the Subspace Processing Function. However, in alternate embodiments, preliminary classification may occur in the Subspace Processing Function, while further, more sophisticated classification may occur in the Signal Processing Function. In the preferred embodiment, the singular vectors associated with the noise subspace are eliminated from further processing. However, in alternative embodiments, the noise subspace may be used for further analysis.

Figure 17:
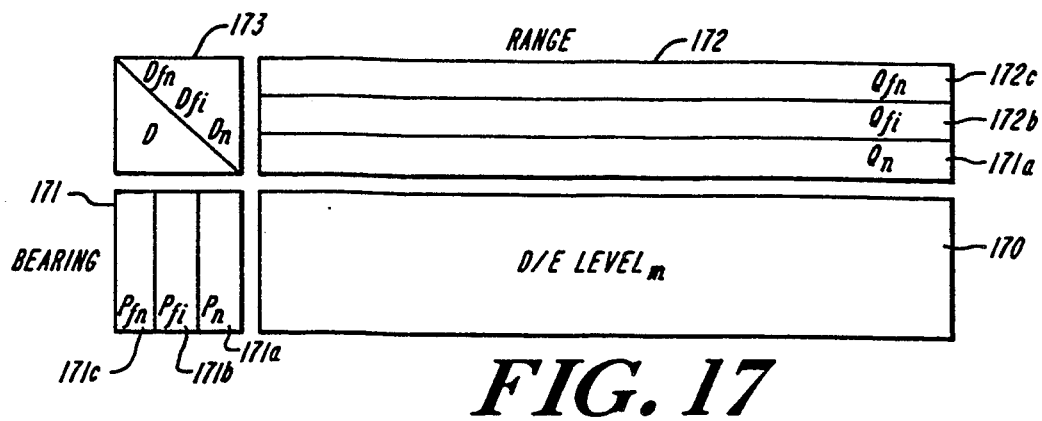
FIG. 17 shows subspace selection when the first alternative method to decompose the data is used.

Referring to FIG. 17, when the first alternative method to decompose the data is used, (i.e. when each D/E level 170 is processed separately and decomposed using SVD into its component parts), the left and right singular vectors 171, 172 are separated into subspaces based on an analysis of the singular values D 173. The subspaces characterize loud features, such as reverberation, interference, and other features not of interest, $P_{fn}$ 171c, $D_{fn}$, $Q_{fn}$ 172c, features of interest $P_{fi}$ 171b, $D_{fi}$, $Q_{fi}$ 172b, and noise $P_n$ 171a, $D_n$, $Q_n$ 172a.

Figure 18:
FIG. 18 shows singular vectors corresponding to features of interest combined to give a single, composite vector for each D/E level.

Referring to FIG. 18, in this embodiment, the singular vectors $P_{fi}$ 171b, $Q_{fi}$ 172b corresponding to features of interest are combined to give a single, composite vector for each D/E level. First, both left and right singular vectors are appropriately weighted (e.g., by the square roots of their corresponding singular values), yielding $P_{wfi}$ and $Q'_{wfi}$. Next the vectors are summed columnwise to yield vectors $P^t_{wfi}$ 180 and $Q'^t_{wfi}$ 181, then concatenated together. In this manner, there is a single vector for each D/E level which summarizes characteristics in terms of both bearing and range.

Figure 19:
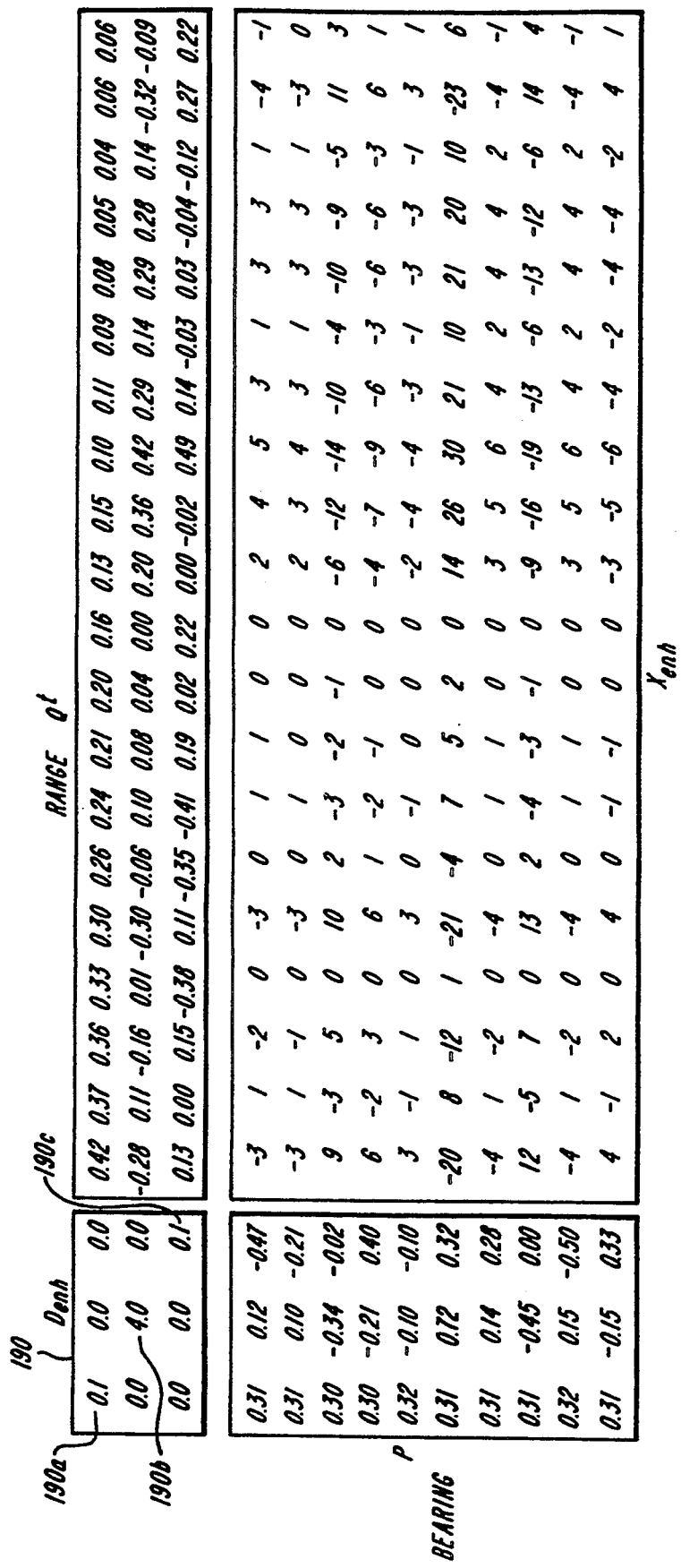
FIG. 19 is the data matrix FIG. 7 as enhanced according to the present invention.

The results of enhancing the data is shown in FIG. 19. In FIG. 19, the sonar data that was used in the example in FIG. 7 is shown. However, the singular values D of the data have been modified to enhance certain weak features and to diminish stronger features, resulting in $D_{enh}$ 190. The singular value associated with reverberation, $D_1$ 190a (in the first row and first column of D) has been reduced from 391 to 0.1. The singular value associated with a weak acoustic feature, $D_2$ 190b has been changed from 31 to 4. The singular values associated with other, unwanted or interfering features has similarly been diminished, in this example, $D_3$ 190c has been reduced from 23 to 0.1. The values for the singular vectors remain the same. In alternative embodiments, singular values below a threshold may be subsequently set to zero and the associated singular vectors eliminated from further analysis.

Figure 20:
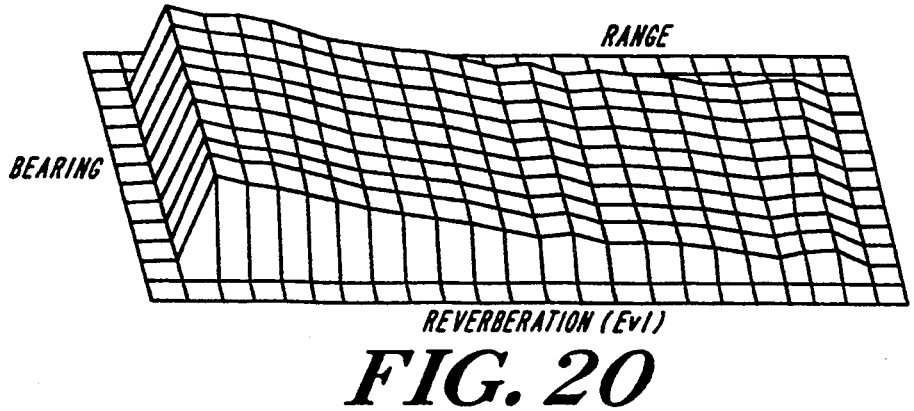
FIG. 20 is a contour graph showing a reverberation/attenuation profile at one depression/elevation angle before data enhancement.
Figure 21:
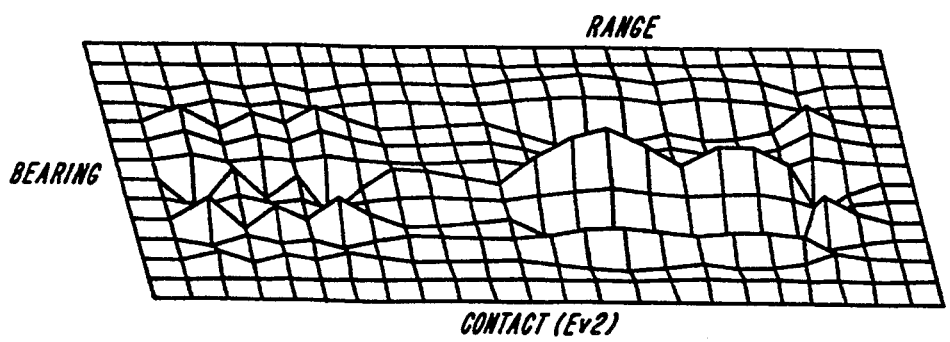
FIG. 21 is a contour graph showing a sonar feature of interest at one depression/elevation angle after data enhancement.

FIGS. 20 and 21 how the results of the data enhancement. FIG. 20 is a contour graph showing a reverberation/attenuation profile at one depression/elevation angle before data enhancement. In the preferred embodiment, this information may be used to optimize settings within the host sonar system. FIG. 21 is a contour graph showing a sonar feature of interest at one depression/elevation angle after data enhancement, when the reverberation has been diminished and the feature of interest has been enhanced.

Referring again to FIG. 11, the Subspace Processing Function 91 computes a set of range data corresponding to features of interest $Q_{fi}$, which describe the range characteristics of acoustic features in the signal subspace. These singular vectors are passed on to the Signal Processing Function for further processing. The associated left singular vector $P_{fi}$ which corresponds to spatial information, are also passed on to the Signal Processing Function, for further processing. Certain singular vectors may be rotated, for example using the varimax criterion, to maximize their loadings towards a particular bearing. Such rotation of $P_{fi}$ would also involve a corresponding rotation of $Q_{fi}$. These operations are well known in the prior art. In alternate embodiments, the singular vectors are passed on to adaptive beamforming operation, which is also well known in the prior art.

The right singular vectors associated with features of interest $Q_{fi}$, may be weighted by adjusting the singular values (or weighted by some other criteria), resulting in weighted features of interest $Q_{wfi}$. The Subspace Processing Function passes range history data in the form of right singular vectors $Q_{fi}$ back to the Preprocessing Function. The Subspace Processing function also passes the weighted singular vectors $P_{wfi}$ and $Q_{wfi}$ forward to the Signal Processing Function.

Signal Processing Function

The resulting compressed and enhanced data, in the form of singular vectors, is passed on to the Signal Processing Function for further enhancement. In acoustic data processing systems, two common forms of signal processing are matched filter processing and doppler processing. In the present invention, the spatial, temporal and spectral normalization process required by prior art systems has been eliminated by eliminating the dominant (loud) singular vectors.

Figure 22:
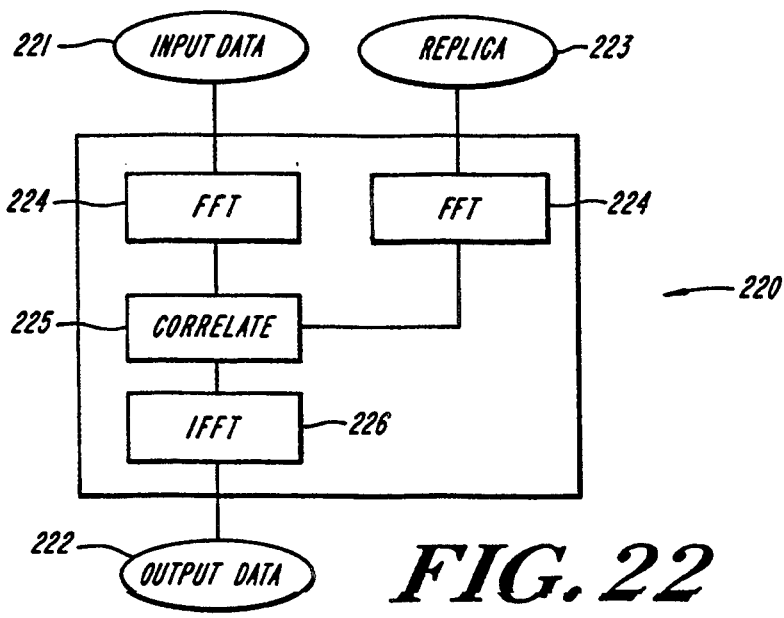
FIG. 22 is a flow chart of the matched filter processing function.

FIG. 22 shows the matched filter processing function 220 of the present invention in greater detail. Matched filter processing is well known in the prior art. In the present invention, however, the input to the matched filter processing is in the form of right singular vectors Q' 221 rather than raw acoustic data. The output data 222 resulting from this function represents echoes from features in the medium being monitored. Initially, the received data 221 and a replica of the transmitted waveform 223 are transformed using fast fourier transform (FFT) 224. The resulting coefficients are then correlated at 225 by multiplying one set of coefficients by the complex conjugate of the other.

The data is correlated through a process called convolution. There are two methods of convolution, convolution in the time domain and convolution in the frequency domain. In convolution in the time domain, the replica is compared on a point by point basis (i.e. multiplied and summed). This sum represents the degree to which the two sets of data overlap. The greater the degree of overlap is, the higher the degree of correlation will be. As each new sample point is received, the replica is shifted and the process is repeated. With large amounts of data, this correlation process may become computationally intensive. Although convolution may be performed in the time domain (i.e. by comparing time samples), it is often more efficient to implement the correlation process in the frequency domain (i.e. by correlating the frequency structures of the received and replica data) and thereby efficiently processing large blocks of data at one time.

Once the data are correlated in the frequency domain, the results are transformed back into the time domain using inverse fast. Fourier transform (IFFT) 226. The output data represents the correlation of the received data with the replica, expressed in the time domain. In alternative embodiments, other forms of advanced signal processing, such as the Maximum Entropy Method, may be used to process the singular vectors.

Figure 23:
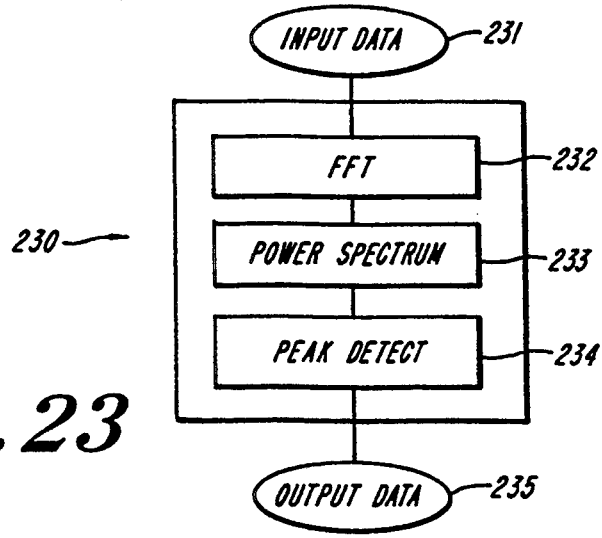
FIG. 23 is a flow chart of the doppler processing function.

Referring to FIG. 23, doppler processing 230 according to the present invention is shown. Acoustic transmission for doppler processing is usually in the form of a burst of continuous wave (CW) energy. The received data is segmented into small time intervals, corresponding to range intervals, and processed to determine if there are doppler shifts in the received energy for the corresponding ranges. The received data 231 in the form of right singular vectors is segmented and transformed into the frequency domain using the fast Fourier transform 232. The results of this operation is transformed into a corresponding power spectrum at 233, by multiplying the transformed data by their complex conjugates. The resulting power spectrum is then analyzed at 234 to determine the location of any large frequency peaks which correspond to the doppler shift of the continuous wave signal caused by features of interest that are moving.

In prior art systems, the greatest frequency power is usually associated with reverberation from the surrounding medium being monitored. Therefore, in prior art systems, it is first necessary to normalize the power spectrum, and then locate and account for this reverberation signal before one can confidently identify a doppler frequency associated with features of interest. Since in ocean-going monitoring systems, the reverberation effect reflects the speed of the monitoring ship, the removal of the reverberation is not a straightforward process.

Doppler processing is well known in the prior art. However, the present invention doppler analysis is performed on the right singular vectors rather than the raw data. This allows the present invention to eliminate the spectral normalization process required by prior art systems. Because the effect of reverberation and attenuation have been removed in the Subspace Processing Function prior to doppler processing, spectral normalization is not required. Thus, in the present invention, the process of locating doppler frequency shifts of features of interest may be simplified and enhanced.

Classification Function

Referring again to FIG. 9, after passing through the Signal Processing Function, the enhanced singular vectors are input to the Classification Function 93. The Classification Function 93 uses the results of signal processing of right singular vectors $Q_{wfi}$, which correspond to weighted features of interest, to classify selected features of interest.

Figure 24:
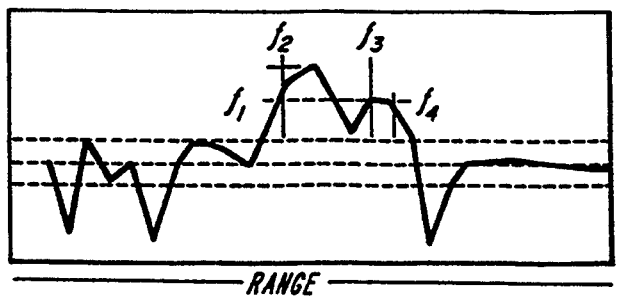
FIG. 24 shows measurements of features of interest measured directly from the signal-processed right singular vectors.

Referring to FIG. 24, measurements of features of interest $f_1$, $f_2$, $f_3$, $f_4$, etc., may be measured directly from the signal-processed right singular vectors $Q_{wfi}$, rather than from signal processing of the raw sonar returns.

In an alternative embodiment, features of interest may first be projected into the original data space, using the matrix product of left and right singular vectors, weighted by a function of their corresponding singular values. Next, the enhanced features of interest may be extracted from the corresponding beams and ranges. However, by using the singular vectors, fewer overall computations may be required.

Enhancement Function

Referring again to FIG. 9, after passing through the Classification Function 93, the sonar data is input to the Enhancement Function 94. Enhanced presentations of features of interest $Y_{efi}$ are generated by the outer product multiplication of the left singular vectors, $P_{fi}$ and the weighted right singular vectors, $Q^t_{wfi}$. In a similar manner, enhanced presentations data of features not of interest $Y_{efn}$ are generated by the outer product multiplication of the left singular vectors, $P_{fn}$ and the weighted right singular vectors, $Q^t_{wfn}$:

$$Y_{efi} = P_{fi} * Q^t_{wfi}$$

$$Y_{enf} = P_{fn} * Q^t_{wfn}.$$

Figure 25:
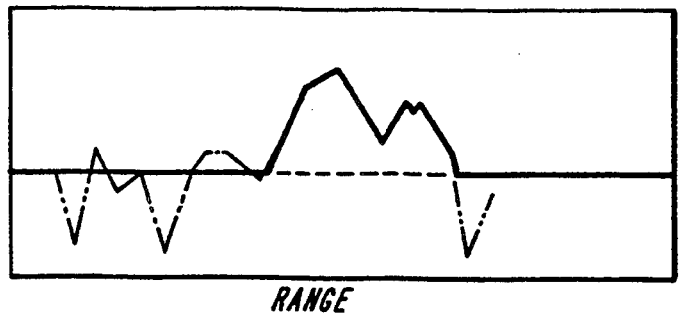
FIG. 25 shows features of interest enhanced further by thresholding the data within the weighted right singular vectors.

Referring to FIG. 25, features of interest within the weighted right singular vectors, $Q_{wfi}$ may be enhanced further, for example, by thresholding the data and retaining feature characteristics above or below certain levels.

Figure 26:
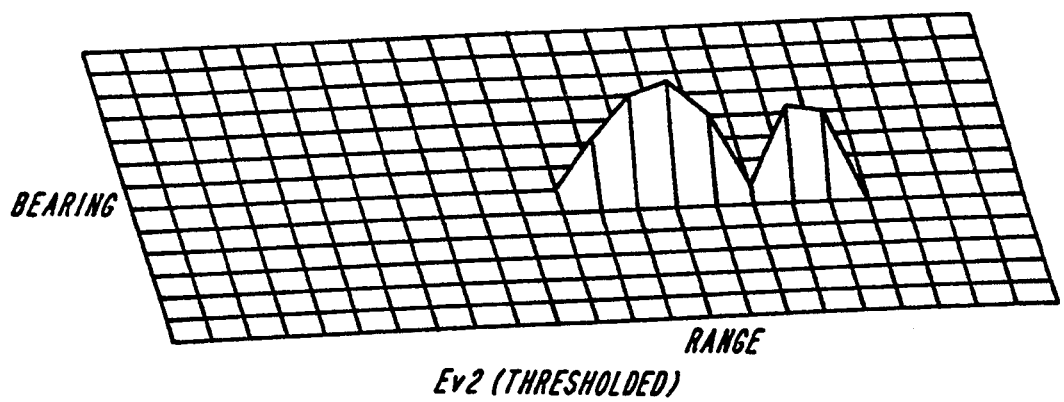
FIG. 26 is a contour graph of the original sonar data of FIG. 6 at one depression/elevation angle after thresholding.

FIG. 26 shows a contour graph of the original sonar data of FIG. 6 at one depression/elevation angle after thresholding. The thresholded data contour graph represents the projection of the thresholded eigenvectors P and $Q^t$.

After unwanted features and noise have been suppressed, and features of interest have been enhanced, the enhanced sonar data is again expanded and reformatted into three-dimensional data.

The reverse of the procedure used to compress the data is used to expand the data. In the preferred embodiment, the data is expanded from the compressed two-dimensional data into three-dimensional data by partitioning the concatenated two-dimensional matrix along the common dimension into a series of two-dimensional matrices. The series of two-dimensional matrices are then arranged into a three-dimensional format.

In the first alternate embodiment, the compressed data $P_n$, $Q_n$ is expanded to one D/E layer n. This process continues until all of the D/E layers have been expanded.

In the second alternate embodiment, as shown in FIG. 15, all three compressed matrices are multiplied together to obtain a full set of data. For each level n, the matrix ($Q_B$ $Q_R^t$) is premultiplied by the appropriate values of P for the n level. The individual D/E layers represent the expanded, enhanced three-dimensional data.

The enhanced expanded, three-dimensional sonar data is then passed on as a sonar data cube for display.

Display

Figure 27:
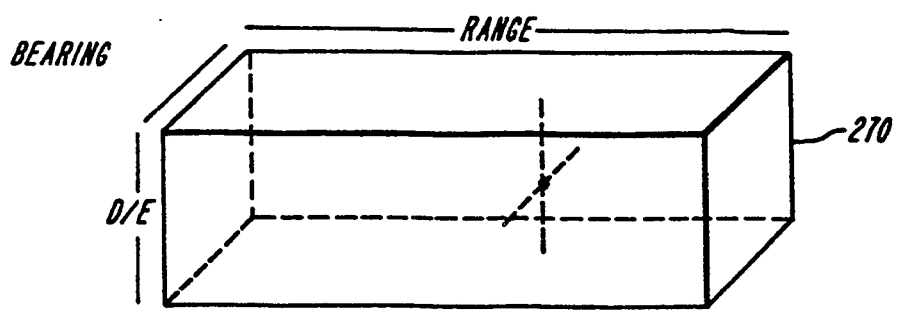
FIG. 27 is a three-dimensional display.

Referring to FIG. 27, in the preferred embodiment of the present invention, features of the enhanced sonar data are displayed in the form of opaque objects within an otherwise transparent data cube 270 on an operator interface screen. The operator can interactively rotate the three-dimensional transparent cube 270 through various angles. In the second alternative embodiment this rotation may be achieved efficiently by rotating the compressed vectors P, $Q_B$ and $Q_R$ before expansion.

The three-dimensional cube 270 can be rotated and displayed from different perspectives. The transparent cube contains enhanced and thresholded three-dimensional data, and displays features in a true spatial format. This type of display is not possible in prior art systems which do not eliminate noise or correlate enhanced data across three dimensions.

The screen display includes range, bearing, and depression/elevation angle cursors, which allow an operator to freely "travel" through the cube, displaying the data at any range, bearing, and depression/elevation angle. The operator can use these cursors to control the display of "slices", or planes, through the cube. The first sonar display could be used to display selected contacts not of interest $Q_{fn}$ while a second sonar display could be used to display features of interest $Q_{fi}$. In an alternative embodiment, the operator may toggle between the two displays.

In an alternate embodiment, a "movie" time history of acoustic data received for each time interval is displayed by thresholding and rapidly expanding the compressed data into its full, three-dimensional form and displaying the data in a time sequence of transparent data cubes. As the data for each time is displayed rapidly, the object displayed within the data cube appears to move.

Figure 28:
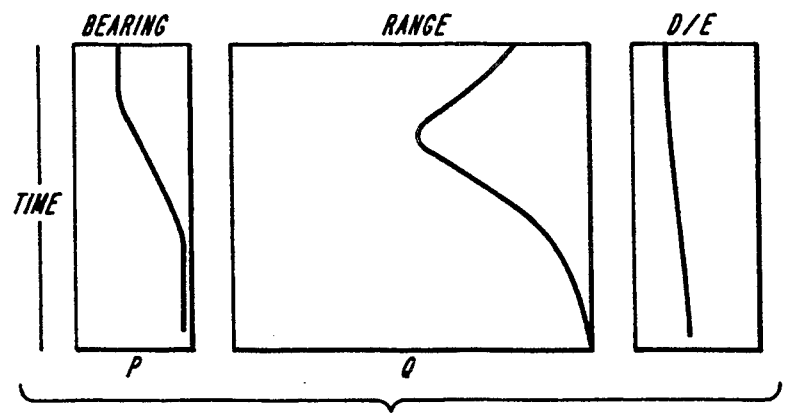
FIG. 28 is a time history display.

FIG. 28 shows an alternative display of the enhanced sonar data. By maintaining sets of singular vectors $P_{fi}$, $Q_{fi}$, and $R_{fi}$, in a historical database, time histories of multiple pings may be displayed in various other formats, including bearing-by-time format, range by time format, and depression elevation angle-by-time format.

Four-Dimensional Processing

Figure 29:
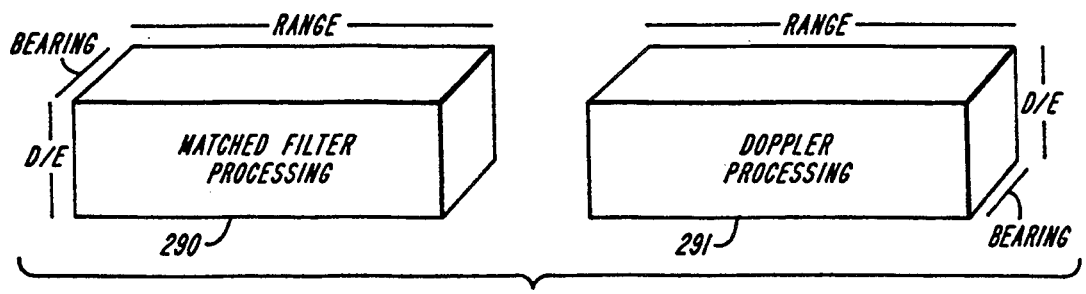
FIG. 29 shows two three-dimensional data cubes, resulting in four-dimensional data processing.

Referring to FIG. 29, four-dimensional data processing according to the present invention is shown. A first three-dimensional active sonar data cube 290 with matched filter processing exists for every data ping. In some active sonar systems both linear, frequency modulated (LFM) and continuous wave (CW) data is transmitted simultaneously. In these systems each data ping also results in a second three-dimensional active sonar data cube 291 with doppler processing. Both of these matrices have dimensions bearing vs. range vs. depression/elevation angle. As data cubes are collected over time for each ping, a series of three-dimensional data cubes are generated. Combining the series of three-dimensional data cubes for processing results in four-dimensional processing.

When data is both matched-filter-processed and doppler-processed and is collected over time, the result is two sets of four-dimensional data matrices. These sets are combined and processed, resulting in five-dimensional data processing.

Under doppler processing, a doppler shift to a higher frequency signifies the approach of an object and a doppler shift to a lower frequency signifies an object moving away from the sensor. This information is displayed in the preferred embodiment by color and intensity. Approaching objects are shown in red, and retreating objects are shown in blue.

Figure 30:
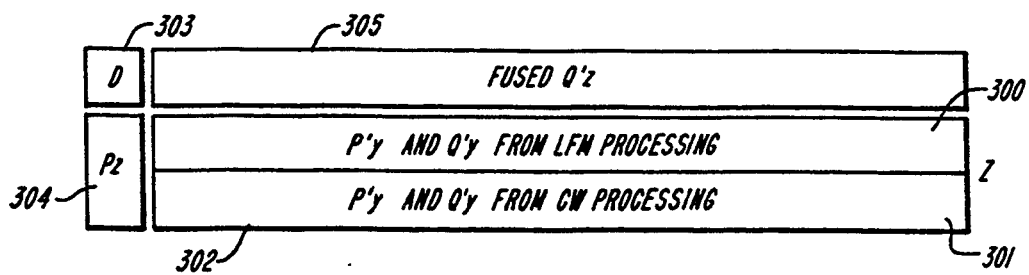
FIG. 30 shows four-dimensional data processing by data "fusion" of singular vectors.

Referring to FIG. 30, in an alternative embodiment, the singular vectors from the matched filter-processed data cube 300 are "fused", or intercorrelated, with the singular vectors from the doppler-processed data cube 301, forming a two-dimensional fused data matrix 302. The matrix is decomposed to its singular values D 303, left singular vectors P 304 and right singular vectors Q 305.

The data from the linear, frequency modulated sonar data cube for a particular ping is summarized by $P'_y$ and $Q'_y$ data 300, as described above. In a similar manner, the continuous wave sonar data cube for the same ping history are summarized by a corresponding $P'_y$ and $Q'_y$ data 300, derived through similar means. These two sets of data are placed in a matrix Z 302 and analyzed using singular value decomposition. In this analysis, the resulting right singular vectors $Q'_z$ describe characteristics of features within the sonar data in terms of their bearing, D/E and range. The left singular vectors $P_z$ describe the relationship of these features in terms of their occurrence in the linear frequency modulated data and/or the continuous wave data.

Figure 31:
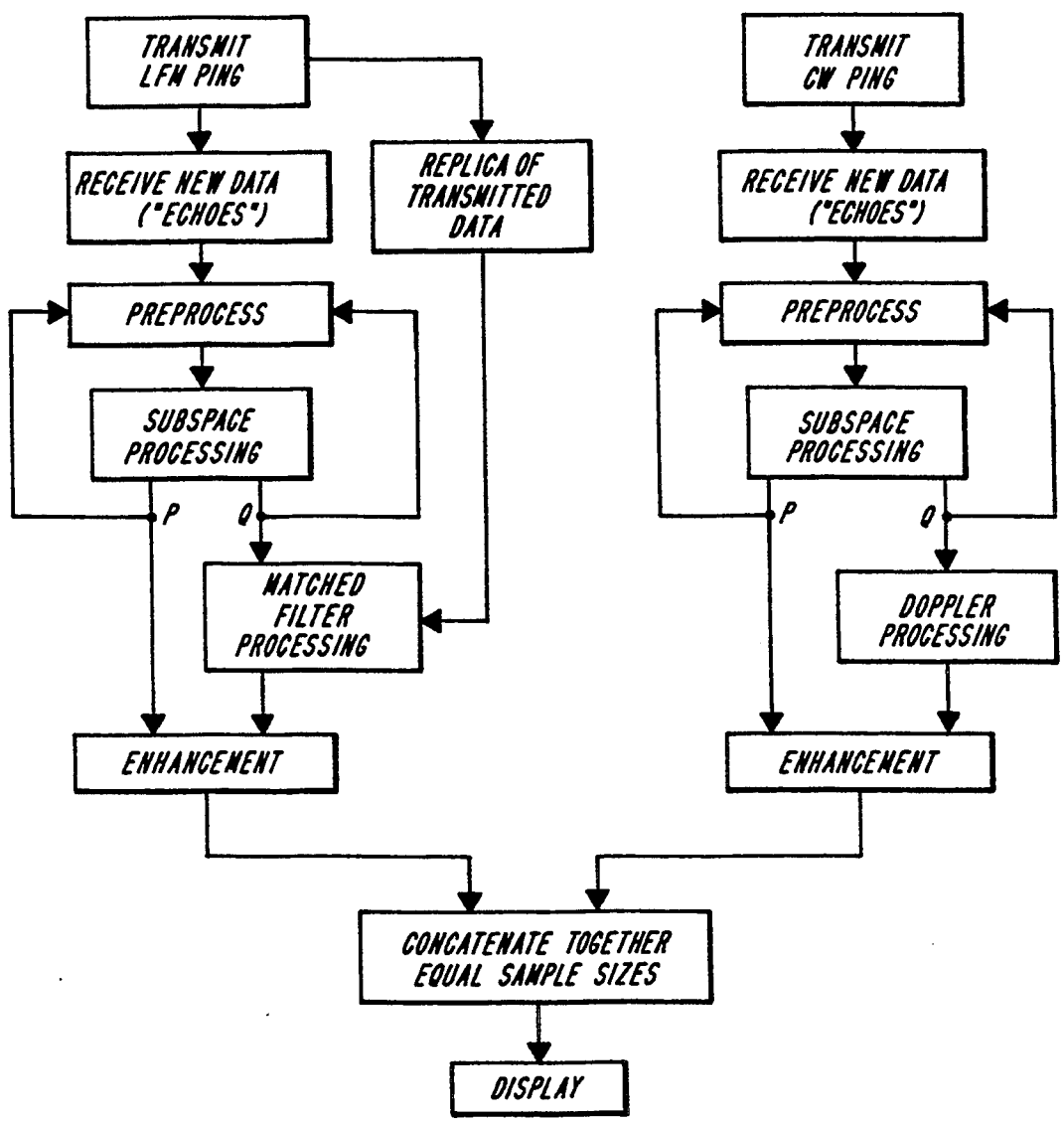
FIG. 31 is a flow chart of an alternate embodiment of four-dimensional processing.

Referring to FIG. 31, an alternate embodiment of four-dimensional processing is shown in which sonar data flows through two separate processing chains. Matched filter processing results in a relatively fine resolution, for example a sample every foot. In contrast, doppler processing generally results in a coarser resolution, for example a sample every 100 feet. This results in fewer doppler range cells per ping. As a result the matched filter data may be averaged and/or subsampled so that it equals the same relative resolution of the doppler processed data. Rather than blind sampling (decimation), a low pass filter of the matched-filter-processed data may be used before decimation to obtain smoothed data points. Equal samples sizes of doppler-processed data and matched filter-processed data are concatenated together.

Referring again to FIG. 27, the four-dimensional data is displayed in the form of a single sonar data cube 270, where the linear, frequency modulated detections are displayed as opaque features in an otherwise transparent sonar data cube having dimensions bearing, range and D/E. Within this data cube, doppler shift information is displayed as a color superimposed upon the linear, frequency modulated detections. For example a red color shows a doppler up-shift, indicating approaching features. A green or blue color shows a doppler downshift, indicating features moving away from the sensor. The intensity of the color is used to indicate the relative speed, or degree of doppler shift.

Referring again to FIG. 16A, in an alternative embodiment, the compressed characterizations of multiple pings are combined and analyzed using singular value decomposition. In this embodiment, the summary vectors for each ping, $R^t$, $P^t$, and $Q^t$ are concatenated together and added to a matrix with other similarly summarized-ping data. The dimensions of the matrix are time (ping history) along the vertical axis, and a combination of D/E, bearing and range along the horizontal axis. The resulting singular vector decomposition results in left singular vectors which describe the temporal history of features in the matrix, and right singular vectors which describe characteristics of each ping data in terms of their D/E angle (leftmost portion of the right singular vectors), bearing (central portion of the right singular vectors) and range (rightmost portion of the right singular vectors).

While the foregoing invention has been described with reference to a preferred embodiment, it should be understood that various modifications and alterations will occur to those skilled in the art. Such modifications and alterations are intended to fall within the scope of the appended claims. Such modifications and alterations include implementing the invention with other multivariate data, including RF data, seismic data, other communication data, and medical imaging data.

In view of the foregoing, I claim:

1. A method for processing information signals representative of data describing at least predetermined events occurring in a predetermined three-dimensional space, comprising the steps of:
(a) generating a matrix from the information signals and each matrix entry is representative of a scaled value associated with a location in the three-dimensional space, with the matrix being representative of at least a selected two-dimensions of the three-dimensions of the predetermined three-dimensional space;
(b) compressing the matrix entries to form compressed signals;
(c)(1) selectively modifying the compressed signals to enhance certain predetermined compressed signals and suppress certain other compressed signals, with the modified compressed signals being representative of the matrix entries that have been at least enhanced and suppressed.

2. The method as recited in claim 1, wherein step (b) includes compressing using single vector decomposition (SVD).

3. The method as recited in claim 2, wherein step (c)(1) includes modifying factors that are used in processing the compressed signals.

4. The method as recited in claim 3, wherein step (c)(1) includes modifying values of a vector that is used in processing the signals compressed by SVD.

5. The method as recited in claim 1, wherein step (b) includes compressing using eigenvector decomposition (EVD).

6. The method as recited in claim 5, wherein step (c)(1) includes modifying factors that are used in processing the compressed signals.

7. The method as recited in claim 6, wherein step (c)(1) includes modifying values of a vector that is used in processing the signals compressed by EVD.

8. The method as recited in claim 1, wherein the method further includes,
(d) processing the modified compressed signals from step (c)(1) by enhancing such signals at least a second time.

9. The method as recited in claim 8, wherein the modified compressed signals that were enhanced at step (d) may be transmitted to a remote location.

10. The method as recited in claim 8, wherein the second enhancement may be performed using matched filter processing.

11. The method as recited in claim 8, wherein the second enhancement may be performed using doppler processing.

12. The method as recited in claim 8, wherein the second enhancement may be performed using maximum entropy method processing.

13. The method as recited in claim 1, wherein the method further includes,
(c)(2) generating a historical file of the modified compressed signals.

14. The method as recited in claim 13, wherein the method further includes,
(c)(3) feeding back a compressed form of the historical file to step (c)(1) for providing a factor in modifying the signals before or after being compressed at step (b).

15. The method as recited in claim 1, wherein the modified compressed signal from step (c)(1) may be transmitted to a remote location.

16. The method as recited in claim 15, wherein the method further includes,
(d) processing the modified compressed signals from step (c)(1) by enhancing them at least a second time at the remote location.

17. The method as recited in claim 16, wherein the second enhancement may be performed using matched filter processing.

18. The method as recited in claim 16, wherein the second enhancement may be performed using doppler processing.

19. The method as recited in claim 16, wherein the second enhancement may be performed using maximum entropy method processing.

20. The method as recited in claim 8, wherein the method further includes,
(e) decompressing the signals processed at step (d) and generating a second matrix, with the matrix entries being representative of at least a selected two-dimensions of the three-dimensions of the three-dimensional space, and generating information signals from the matrix capable of describing at least predetermined events occurring in a predetermined three-dimensional space that have been enhanced;
(f) generating a representative three-dimensional space from information signals generated at step (e) from a plurality of matrices; and
(g) displaying the three-dimensional space generated at step (f) on display means, with the displayed three-dimensional space having at least predetermined features of interest enhanced and predetermined features not of interest suppressed.

21. A method for processing information signals representative of data describing at least predetermined events occurring in a predetermined two-dimensional space, comprising the steps of:
(a) generating a matrix from the information signals and each matrix entry is representative of a scaled value associated with a location in the two-dimensional space;
(b) compressing the matrix entries to form compressed signals;
(c)(1) selectively modifying the compressed signals to enhance certain predetermined compressed signals and suppress certain other compressed signals, with the modified compressed signals being representative of the matrix entries that have been at least enhanced and suppressed.

22. The method as recited in claim 21, wherein step (b) includes compressing using single vector decomposition (SVD).

23. The method as recited in claim 22, wherein step (c)(1) includes modifying factors that are used in processing the compressed signals.

24. The method as recited in claim 23, wherein step (c)(1) includes modifying values of a vector that is used in processing the signals compressed by SVD.

25. The method as recited in claim 21, wherein step (b) includes compressing using eigenvector decomposition (EVD).

26. The method as recited in claim 25, wherein step (c)(1) includes modifying factors that are used in processing the compressed signals.

27. The method as recited in claim 26, wherein step (c)(1) includes modifying values of a vector that is used in processing the signals compressed by EVD.

28. The method as recited in claim 21, wherein the method further includes, (d) processing the modified compressed signals from step (c)(1) by enhancing such signals at least a second time.

29. The method as recited in claim 28, wherein the modified compressed signals that were enhanced at step (d) may be transmitted to a remote location.

30. The method as recited in claim 28, wherein the second enhancement may be performed using matched filter processing.

31. The method as recited in claim 28, wherein the second enhancement may be performed using doppler processing.

32. The method as recited in claim 28, wherein the second enhancement may be performed using maximum entropy method processing.

33. The method as recited in claim 21, wherein the method further includes,
(c)(2) generating a historical file of the modified compressed signals.

34. The method as recited in claim 33, wherein the method further includes,
(c)(3) feeding back a compressed form of the historical file to step (c)(1) for providing a factor in modifying the signals before or after being compressed at step (b).

35. The method as recited in claim 21, wherein the modified compressed signal from step (c)(1) may be transmitted to a remote location.

36. The method as recited in claim 35, wherein the method further includes,
(d) processing the modified compressed signals from step (c)(1) by enhancing them at least a second time at the remote location.

37. The method as recited in claim 36, wherein the second enhancement may be performed using matched filter processing.

38. The method as recited in claim 36, wherein the second enhancement may be performed using doppler processing.

39. The method as recited in claim 36, wherein the second enhancement may be performed using maximum entropy method processing.

40. The method as recited in claim 28, wherein the method further includes,
(e) decompressing the signals processed at step (d) by generating a second matrix and generating information signals from the second matrix capable of describing at least predetermined events occurring in a predetermined two-dimensional that have been enhanced; and
(f) displaying the two-dimensional space that was generated from the information signals generated at step (e) on display means, with the displayed two-dimensional space having certain predetermined events enhanced and other predetermined events suppressed.

* * * * *